Patented Mar. 1, 1932

1,848,072

UNITED STATES PATENT OFFICE

WALTER BRUCK, OF MANNHEIM, GERMANY, ASSIGNOR TO GENERAL ANILINE WORKS, INC., OF NEW YORK, N. Y., A CORPORATION OF DELAWARE

PRODUCTION OF CHLOROANTHRAQUINONEACRIDONE

No Drawing. Application filed January 18, 1930, Serial No. 421,727, and in Germany January 25, 1929.

The present invention relates to the production of chloroanthraquinoneacridone.

In the U. S. Patent No. 1,133,081 it has been shown that anthraquinoneacridones which contain more or less halogen according to the reaction conditions, as for example the temperature, the solvents employed and the like, are obtained by causing halogen or agents supplying halogen, such as sulphuryl chloride, to act on 1-anilido-2-methylanthraquinone or on 1-ortho-toluidoanthraquinone. By the treatment of the said initial materials with chlorine or agents supplying chlorine, in trichlorbenzene or another suitable organic solvent as for example another halogen derivative of benzene, even while maintaining constant conditions such as temperature, concentration and the like, uniform compounds are not obtained, but mixtures of different products are formed.

I have now observed that by the action of a chlorinating agent which term comprises chlorine and agents supplying chlorine, on 1-anilido-2-methylanthraquinone or 1-ortho-toluidoanthraquinone in trichlorbenzene and like solvents described in the patent already referred to, generally speaking chlorinated anthraquinoneacridones are not directly formed, but a mixture of different intermediate products, the latter being then converted into chloroanthraquinoneacridones by the splitting off of chlorine in the form of hydrogen chloride.

I have now found that the aforesaid intermediate products are of different solubility in organic solvents and that the intermediate product which is comparatively readily soluble yields by the splitting off of chlorine in the form of hydrogen chloride a substantially uniform anthraquinoneacridone containing about 5 atoms of chlorine. The splitting off of chlorine in the form of hydrogen chloride can be promoted by heating or by the addition of reducing agents. Due to its greater solubility the intermediate product yielding the said chloranthraquinoneacridone predominates in the mother liquors obtained during the chlorination and can be recovered therefrom by the usual methods. Frequently, however, it is also contained in the product which separates out, and in this case it can be extracted therefrom for example by means of suitable solvents.

In order to obtain as large an amount as possible of the new and valuable dyestuff or of the intermediate product which yields the same it is preferable to carry out the chlorination while excluding moisture, and, when employing gaseous chlorinating agents, to carry out the reaction as rapidly as possible which may be effected for example by using a large number of inlet nozzles for the gas.

The substantially uniform anthraquinoneacridone containing about 5 atoms of chlorine obtained according to my invention yields on boiling with diethylaniline an anthraquinoneacridone containing about 4 atoms of chlorine, dyeing cotton orange shades, and furnishing on chlorination a chloroanthraquinoneacridone having the same dyeing properties as the initial material. It is distinguished by still more valuable properties than those of the dyestuffs described in the said patent, and is especially distinguished by a brilliance hitherto never attained in the anthraquinoneacridone series.

The following examples will further illustrate how the said invention may be carried out in practice but the invention is not restricted to these examples. The parts are by weight.

Example 1

About 110 parts of chlorine are led at from 170° to 180° centigrade during the course of about 5 hours into a solution of 50 parts of 1-anilido-2-methylanthraquinone in 350 parts of trichlor-benzene. The reaction mixture is allowed to cool and is filtered by suction from the crystalline precipitate. The filtrate is allowed to stand for one or more days; during this time microscopic needles separate which dissolve in concentrated sulphuric acid giving an orange red coloration. The same product may also be recovered by distilling the filtrate with steam.

10 parts of the intermediate product thus obtained are heated to boiling for about 1 hour with 100 parts of orthodichlorbenzene and 10 parts of crude carbolic acid. In this manner a vigorous evolution of hydrochloric acid takes place. When the mixture is cooled the new dyestuff crystallizes in the form of small lustrous rhombic crystals. It dissolves in concentrated sulphuric acid giving an orange red coloration and is precipitated as a red flocculent precipitate by diluting the solution with water. It dyes cotton from a violet vat extremely brilliant bluish red shades.

*Example 2*

The filtrate obtained as described in Example 1 is heated to boiling for about 1 hour, hydrochloric acid being thus evolved. The dyestuff which separates in a crystalline form after cooling practically corresponds in its reactions and shade of color with the dyestuff obtained in Example 1.

By working up in the same manner the mother liquors which arise in the production of the dyestuff obtained from 1-orthotoluido-anthraquinone with chlorine in trichlorbenzene as described in Example 4 of the U. S. Patent No. 1,133,081 or in the production of the product prepared by treatment of 1-anilido-2-methylanthraquinone or 1-ortho-toluidoanthraquinone with sulphuryl chloride according to Example 1 of the British specification No. 14,360, A. D. 1914, a brilliant bluish red dyestuff is likewise obtained which is apparently practically identical with the dyestuff hereinbefore described.

What I claim is:—

1. A process of producing chloroanthraquinoneacridone which comprises treating 1-phenylimino - anthraquinone containing a methyl group in ortho position to the imino group, dissolved in a halogen derivative of benzene with a chlorinating agent, separating the chlorination product more readily soluble in organic solvents and splitting off chlorine in the form of hydrogen chloride from the separated product by heating it in an organic solvent in the presence of a phenol.

2. As a new article of manufacture substantially uniform anthraquinonacridone containing about 5 atoms of chlorine, dissolving in concentrated sulphuric acid to give an orange red solution from which it is precipitated as a red flocculent precipitate on dilution with water, dyeing cotton from a violet vat brilliant bluish red shades, which dyestuff yields on boiling with diethylaniline an anthraquinoneacridone containing about 4 atoms of chlorine, dyeing cotton orange shades, and being converted by the action of chlorine into a product having the same tinctorial properties as the initial material.

In testimony whereof I have hereunto set my hand.

WALTER BRUCK.